(12) United States Patent
Lin

(10) Patent No.: US 8,116,328 B2
(45) Date of Patent: Feb. 14, 2012

(54) METHOD AND APPARATUS FOR ADJUSTING VALUE OF STATISTIC PARAMETER

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 12/143,998

(22) Filed: Jun. 23, 2008

(65) Prior Publication Data

US 2008/0259814 A1    Oct. 23, 2008

Related U.S. Application Data

(63) Continuation of application No. PCT/CN2006/003372, filed on Dec. 12, 2006.

(30) Foreign Application Priority Data

Dec. 26, 2005 (CN) .......................... 2005 1 0111987

(51) Int. Cl.
   *H04L 12/28* (2006.01)
(52) U.S. Cl. ........................................ 370/401; 370/252
(58) Field of Classification Search .................. 370/401, 370/252
   See application file for complete search history.

(56) References Cited

U.S. PATENT DOCUMENTS

| | | | | |
|---|---|---|---|---|
| 6,832,254 | B1 * | 12/2004 | Scoggins et al. | 709/227 |
| 2003/0031137 | A1 | 2/2003 | Mecklin Tomas | |
| 2003/0169751 | A1 * | 9/2003 | Pulkka et al. | 370/401 |
| 2003/0227908 | A1 * | 12/2003 | Scoggins et al. | 370/352 |
| 2004/0114572 | A1 * | 6/2004 | Pilon et al. | 370/352 |
| 2006/0114868 | A1 * | 6/2006 | Park | 370/338 |
| 2006/0236101 | A1 | 10/2006 | Qiao et al. | |

FOREIGN PATENT DOCUMENTS

| | | |
|---|---|---|
| CN | 1581858 A | 2/2005 |
| CN | 1622581 A | 6/2005 |
| WO | WO 01/67683 A1 | 9/2001 |

OTHER PUBLICATIONS

International Telecommunication Union, "Gateway Control Protocol: Version 3; H.248.1," ITU-T Standard Superseded, 1-195 ('Sep. 2005).*

(Continued)

*Primary Examiner* — Derrick Ferris
*Assistant Examiner* — Matthew Hopkins
(74) *Attorney, Agent, or Firm* — Leydig, Voit & Mayer, Ltd.

(57) ABSTRACT

The present invention relates to a method and apparatus for adjusting the value of the statistic parameter so as to enable an MGC dynamically adjust the statistic parameter under H.248 framework. The method extends the H.248 protocol. The MGC sends adjustment information to the MG. The MG adjusts the value of the specified statistic parameter in a specified adjustment manner according to the adjustment information. The adjustment manner may be direct value assignment or one adjustment operation executed by the MG combining with a local preset parameter. If the adjustment information can not be recognized or supported by the MG, or the adjustment information is not suitable for the statistic parameter, the MG returns corresponding error information to the MGC. The adjustment to the statistic parameter value by the MGC may be issued to the MG for execution at the same time with other operations such as audit.

8 Claims, 3 Drawing Sheets

```
┌─────────────────────────────────────┐
│  The media gateway controller issues│
│  adjustment information to the MG.  │
│  The adjustment information         │──── S11
│  designates a statistic parameter   │
│  that needs to be adjusted and      │
│       adjustment manner;            │
└─────────────────────────────────────┘
                  │
                  ▼
┌─────────────────────────────────────┐
│  The MG sets the value of the       │
│  designated statistic parameter in  │
│  the designated adjustment manner   │──── S12
│  according to the received          │
│         adjustment information.     │
└─────────────────────────────────────┘
```

OTHER PUBLICATIONS

International Telecommunication Union, "Gateway Control Protocol: Version 2; H.248.1," *ITU-T Standard*, 1-137 (May 2002).
International Telecommunication Union, "Gateway Control Protocol: Version 3; H.248.1," *ITU-T Standard Superseded*, 1-195 (Sep. 2005).
Lin, "New Package 'H.248.ERTP' to Support Periodic Acquisition of QoS by Audit; D128," *ITU-Telecommunication Standardization Sector*, Study Group 16: 1-6 (Jul. 2005).
Lin, "New Package 'H.248.ERTP' to Support Periodic Acquisition of QoS by Notify; D129," *ITU-Telecommunication Standardization Sector*, Study Group 16: 1-9 (Jul. 2005).
Written Opinion of the International Searching Authority in corresponding PCT Application No. PCT/CN2006/003372 (Mar. 29, 2007).
International Search Report in corresponding PCT Application No. PCT/CN2006/003372 (Mar. 29, 2007).
1st Office Action in corresponding European Application No. 06828295.3 (Apr. 1, 2009).
1st Office Action in corresponding Chinese Application No. 200510111987.5 (Feb. 27, 2009).
Rejection Decision in corresponding Chinese Application No. 200510111987.5 (Apr. 6, 2010).
Notice of Re-examination in corresponding Chinese Application No. 200510111987.5 (Jun. 20, 2011).
"Analysis on Mc Interface in 3G Mobile Communication System Based on Separated Control and Bearer," p. 1-55, 2004.

* cited by examiner

METHOD AND APPARATUS FOR ADJUSTING VALUE OF STATISTIC PARAMETER

CROSS-REFERENCE TO RELATED APPLICATIONS

The application is a continuation of International Patent Application No. PCT/CN2006/003372, filed Dec. 12, 2006, which claims priority to Chinese Patent Application No. 200510111987.5, filed Dec. 26, 2005, entitled "Method for Adjusting Value of Statistic Parameter in Media Gateway," both of which are hereby incorporated by reference in their entirety.

FIELD OF THE INVENTION

The present invention relates to a network with bearing and controlling separated, and particularly to a method and apparatus for adjusting the value of a statistic parameter in media gateway.

BACKGROUND

In all the report about the latest development of communication techniques, next generation network (NGN) and 3rd generation (3G) mobile communication have become two focuses recently.

The definition of the NGN keeps changing during its development. At "2004 Global NGN Summit Forum" hosted by International Telecommunication Union (ITU), the standard of NGN is defined as a packet-based network capable of providing various services including telecommunication service and using transmission techniques supporting different bandwidths and having quality of service (QoS) assurance. The final development direction and scope of the NGN is thus determined.

Judging from the deployment of the NGN, two key components are adopted by the NGN for networking: a media gateway control controller (MGC) and a media gateway (MG). The MGC is responsible for the function of calling control. The MG is responsible for the function of service bearing so as to implement the separation of the calling control plane and the service bearing plane. The two can involve independently so that it is possible to fully share the network resources, simplify equipment upgrade and service expansion, and greatly reduce the cost of development and maintenance.

Media gateway control protocol is a main protocol for the communication between an MGC and an MG. Currently the widely used protocols are gateway control protocol/H.248 (H.248/MeGaCo) and media gateway control protocol (MGCP). The communication protocol between MGs is real-time transfer protocol (RTP) as shown in FIG. 1.

The H.248/MeGaCo protocol version 1 was established by the IETF and the ITU jointly in Nov., 2000 and revised in Jun., 2003. The H.248/MeGaCo protocol version 2 was established by the ITU in May, 2002 and revised in Mar., 2004. The H.248/MeGaCo protocol version 3 was issued by the ITU in Sep., 2005.

Regarding the H.248/MeGaCo protocol, there are 8 basic commands between the MGC and the MG as follows: Add, Modify, Subtract, Move, AuditValue, AuditCapabilities, Notify, and ServiceChange.

In the H.248 protocol, the MG implements the service bearing through the resources on it. The resource is abstractly represented as a Termination. The Termination is further classified into a Physical Termination and an Ephemeral Termination. The former represents some semi-permanently existing physical entity such as time division multiplexing (TDM) channels. The later represents some ephemerally applied public resources released after being used, such as RTP flows. The combination among Terminations is abstractly represented as Context including many Terminations. Therefore, Topology is always used to describe the mutual relationship between Terminations. A Termination not associated with other Terminations may be included by a special Context called Null Context.

In such an abstract model based on the H.248 protocol, connection of a call lies actually in operations of Terminations and the Contexts. The operations are completed through the command requests and responses between the MGC and the MG. Command parameters, also called Descriptor, are classified into Property, Signal, Event and Statistic. The parameters with service pertinency are logically aggregated into a Package.

Specifically, the Property represents the specification of resource requirements. It is usually issued by the MGC to the MG or is set by the MG itself, for example, maximum or minimum value set by a jitter buffer.

The Signal is used by the MGC to instruct the MG to perform resource operation, for example, play a dial tone, a ring back tone, a busy tone to users.

The Event is used by the MGC to instruct the MG to monitor status, for example, monitor the user's Off-hook, On-hook, Dialing, Flash-hook.

The Statistic represents the utilization status of the resource on the Termination or Stream. Generally, the MG performs calculation operation. The MGC may optionally perform Enable or Disable, i.e. Activate or Deactivate some of the parameters, such as current value or average value applied by a jitter buffer, accumulation statistics of time length, accumulation statistics of the number of sent or received byte, accumulation statistics of the number of sent or received packet, statistics of packets current loss rate, statistics of current value of receiving jitter, statistics of current value of transmission delay, statistics of accumulation discarding rate of network packets, statistics of accumulation discarding rate of jitter buffer. According to the requirement of QoS monitoring and controlling, more statistic parameters may be extended such as those about packet loss rate with a time period, maximum, minimum or average value of delay or jitter.

The current H.248 protocol regulates that the collection, calculation and recording of information relevant to the statistic parameter are actually operated by the MG. The MGC can only perform Enable or Disable besides that the MGC can obtain the value of the parameter by Audit. It can be seen that, the MGC only has the ability to obtain the result of the statistic parameter operated by the MG but the MGC does not have the ability to intervene the operation control process. Typically, the MGC does not have the mechanism to dynamically adjust the value of some statistic parameter in service, i.e. in enabled or active status into a standard value.

SUMMARY

The technical problem seeking to be solved by embodiments of the present invention is to provide a method and an apparatus for adjusting the value of a statistic parameter so as to solve the problem that the MGC can not dynamically adjust the statistic parameter under H.248 framework in prior art.

In order to solve the above problem, the embodiment of the present invention provides a method for adjusting the value of a statistic parameter. The method includes the following steps:

The MGC issues adjustment information to the MC. The adjustment information specifies a statistic parameter to be adjusted and an adjustment manner;

The MG sets the value of the specified statistic parameter in the specified adjustment manner according to the received adjustment information.

In addition, the embodiment of the present invention further provides an apparatus for adjusting the value of the statistic parameter. The apparatus includes:

an adjustment control unit, adapted to send adjustment information specified by an MGC, the adjustment information including a statistic parameter and adjustment manner; and an adjustment executing unit connected with the adjustment control unit, adapted to set the value of the specified statistic parameter according on the specified adjustment manner in the received adjustment information.

It can be seen that, in one of various embodiments of the present invention, the MGC sends adjustment information to the MG. The MG adjusts the value of the specified statistic parameter in the specified adjustment manner according to the adjustment information so as to enable the MGC to dynamically adjust the value of a statistic parameter in service on the MG into a standard value and greatly enhance the control ability and flexibility for mastering QoS status.

DETAILED DESCRIPTION

In order to make the objects, technical solutions and merits of the present invention clearer, a further detailed description of embodiments of the present invention is given by reference to accompanying drawings.

Figure 1:
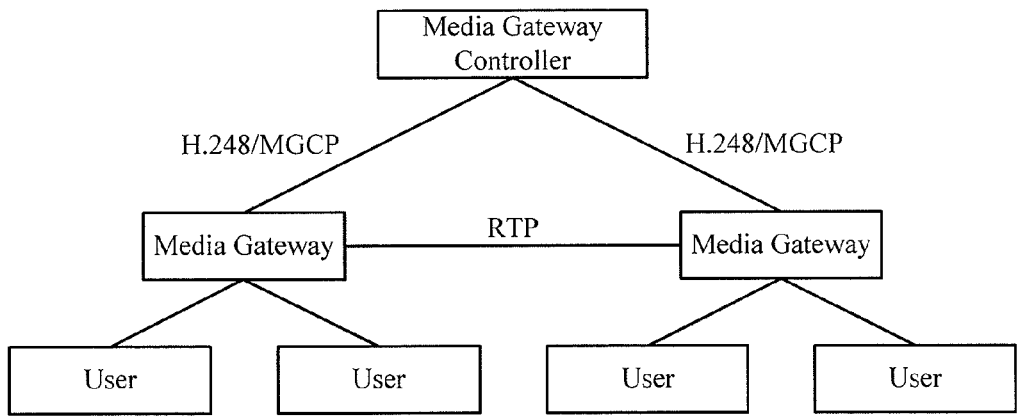
FIG. 1 is a schematic view illustrating a network structure of an MGC and an MG.
Figure 2:
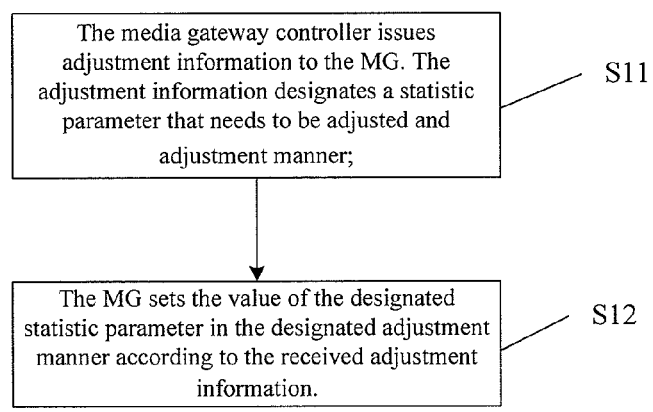
FIG. 2 is a flowchart illustrating a method for adjusting the value of the statistic parameter in accordance with an embodiment of the present invention.

As shown in FIG. 2, it is a flowchart illustrating a method for adjusting the value of the statistic parameter in accordance with an embodiment of the present invention. The method includes following steps:

Step S11: The MGC issues adjustment information to the MG. The adjustment information specifies a statistic parameter to be adjusted and an adjustment manner;

Step S12: The MG set the value of the specified statistic parameter in the specified adjustment manner according to the received adjustment information.

The present invention enables the MGC to directly adjust the value of the statistic parameter on the MG by extending the H.248 protocol. The specified statistic parameter may be adjusted by an issuing numerical value or an identifier of the adjustment operation. The present invention also enables the MGC to dynamically adjust the value of some statistic parameter in service on the MG into a standard value and greatly enhance the control ability and flexibility for mastering QoS status.

Figure 3:
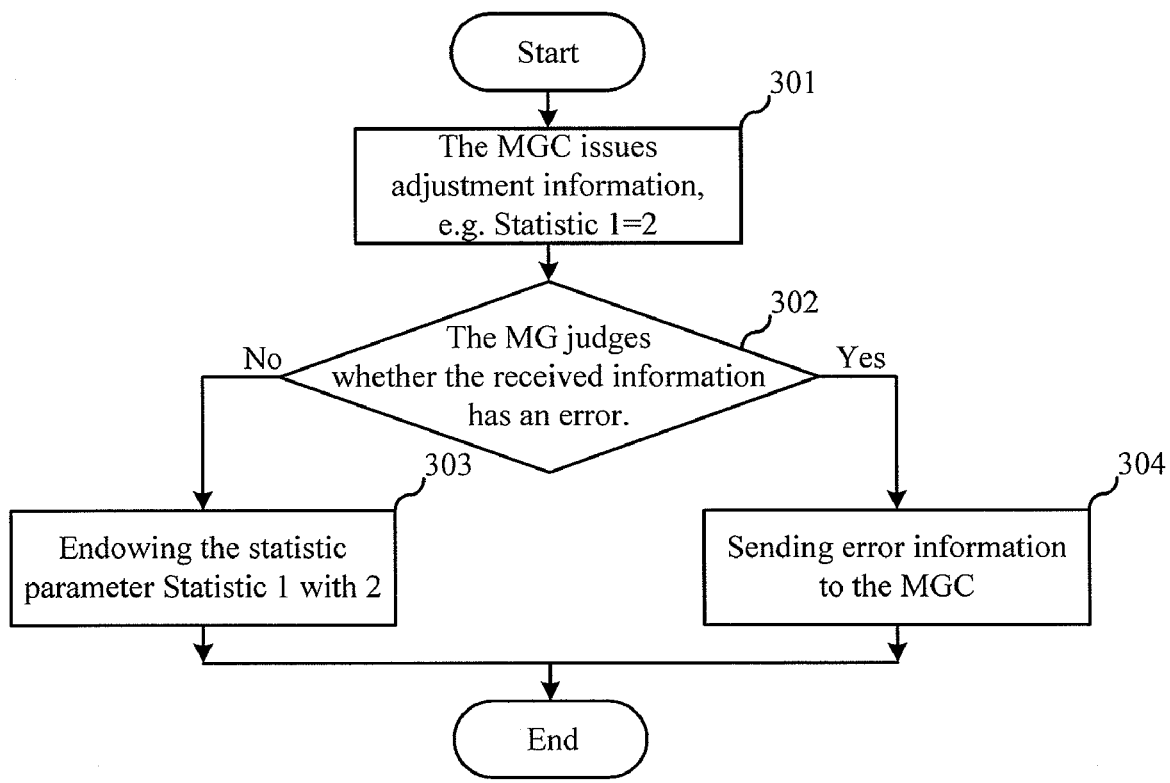
FIG. 3 is a flowchart illustrating a method for adjusting the value of the statistic parameter in the MG in accordance with a first embodiment of the present invention.

As shown in FIG. 3 also, it is a flowchart illustrating a method for adjusting the value of the statistic parameter in the MG in accordance with a first embodiment of the present invention. In the present embodiment, the statistic parameter is explained by taking Statistic1 as an example but not limited to it. The method includes following steps:

Step 301: The MGC issues adjustment information to the MG in a direct value assignment manner. For example, the MGC issues adjustment information "Statistic1=2" to the MG in a direct value assignment manner. The adjustment information includes specific numerical value 2.

Step 302: The MG judges whether the received adjustment information has an error, that is, whether the adjustment information can be recognized or supported by the MG and whether the adjustment manner in the adjustment information is suitable for the specified statistic parameter, e.g. the statistic parameter Statistic1. If the adjustment manner is not suitable for the specified statistic parameter, it is considered that the received adjustment information has an error, step 304 is performed; otherwise, step 303 is performed.

Step 303: The MG assigns the numerical value of the adjustment information to the statistic parameter, that is, the MG assigns the received numerical value 2 to the statistic parameter Statistic1. It can be seen that, this manner of adjustment does not need to preserve any data on the MG. The MGC has the standard value for each statistic parameter so as to facilitate the MGC for centralized management.

Step 304: The MG sends error information to the MGC such as an error code and an explanation thereof. By the returned error information, the MGC can master the clear error reason in time for facilitating the follow-up processing for errors.

Figure 4:
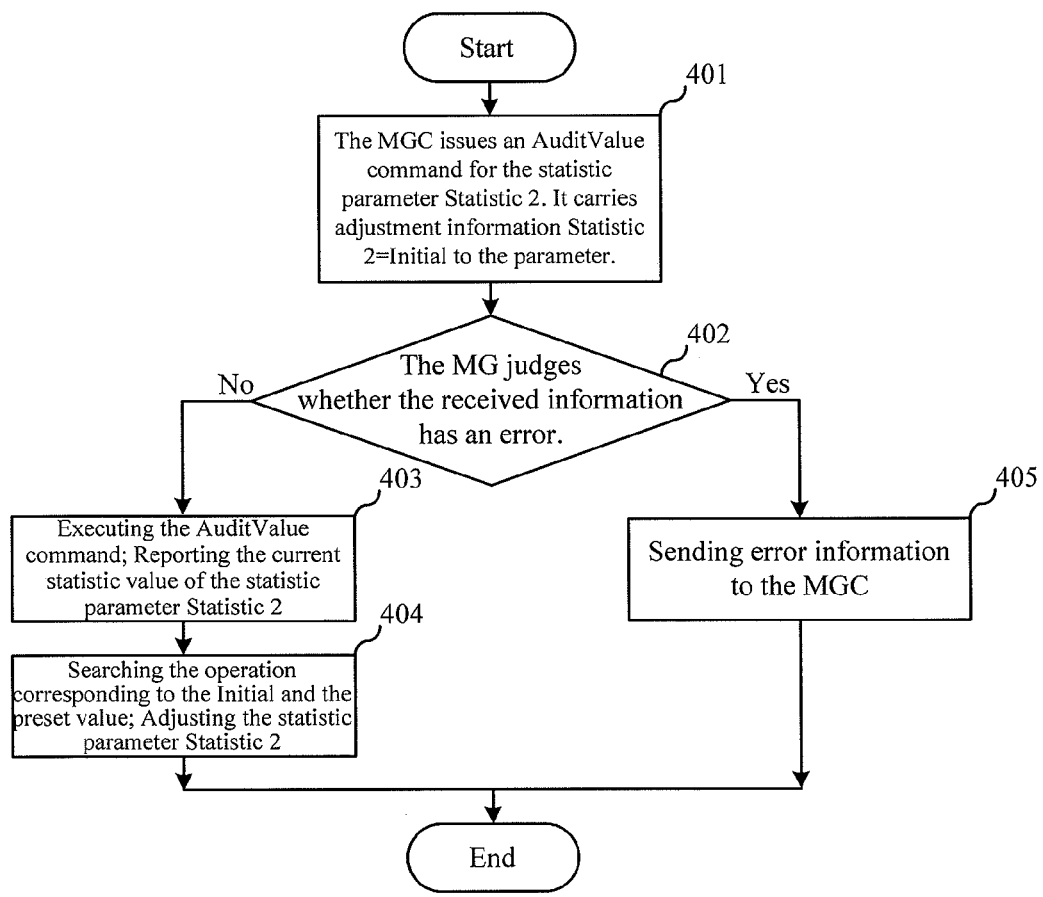
FIG. 4 is a flowchart illustrating a method for adjusting the value of the statistic parameter in the MG in accordance with a second embodiment of the present invention.

As shown in FIG. 4 also, it is a flowchart illustrating the method for adjusting the value of the statistic parameter in the MG in accordance with the second embodiment of the present invention. In the present embodiment, the statistic parameter is explained by taking Statistic2 as an example but not limited to it. The method includes following steps:

Step 401: When the MGC issues an AuditValue command to the statistic parameter Statistic2, the command carries adjustment information "Statistic2=Initial" to the parameter. The "Initial" represents an operation identifier of adopting an initial value. In the adjustment information, the value assigned to the statistic parameter may also be another operation identifier adopting some standard value, such as "Maximum" representing to adopt an upper limit value, "Minimum" representing to adopt a lower limit value, "Average" representing to adopt a average value, "Degressive" representing to reduce a preset step length, "Increasing" representing to add a preset step length. These operation identifiers need to be provisioned in advance between the MGC and the MG.

Step 402 is similar to step 302. The MG judges whether the received adjustment information has an error, that is, whether the adjustment information can be recognized or supported by the MG and whether the adjustment manner in the adjustment information is suitable for the specified statistic parameter, e.g. the statistic parameter Statistic2. If the adjustment information is not suitable for the specified statistic parameter, it is considered that the received adjustment information has an error and step 405 is performed; otherwise, step 403 is performed.

In the step 403, the MG executes the AuditValue command to report the current value of the specified statistic parameter Statistic2 to the MGC. The adjustment by the MGC to the value of the statistic parameter may be issued not only with the Audit operation at the same time but also with other operations, such as Enable or Disable to the MG so as to reduce the number of messages that need to be sent, reduce the amount of traffic on the communication line between the MGC and the MG, effectively support the requirement of possibly processing these operations and adjustment subsequently.

In the step 404, the MGC finds out that the corresponding operation is to adopt an initial value and the corresponding standard value is 0 according to an identifier Initial of the adjustment operation in the adjustment information. The MGC assigns the statistic parameter Statistic2 with the initial value 0 and takes count from the value. In the manner of issuing adjustment operation, the MGC dose not need to master the specific value of each standard value, and only needs to preset each adjustment operations identifier corresponding to the adjustment operation and the standard value adopted by the operation on the MG. Therefore, each MG can define the default parameter of the adjustment operation according to the practical situation of itself. This is more flexible for the MG.

Step 405 is similar to step 304. The MG sends error information to the MGC such an error code and an explanation thereof. By the returned error information, the MGC can master the clear error reason so as to facilitate the follow-up processing for errors.

Figure 5:
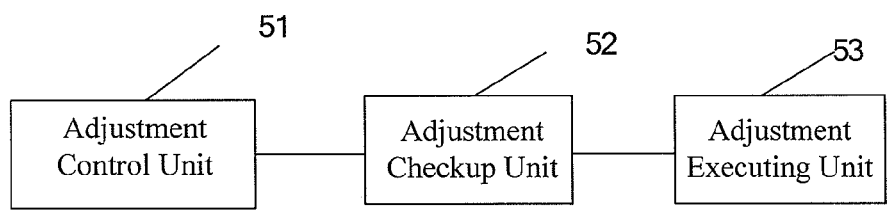
FIG. 5 is a schematic view illustrating an apparatus for adjusting the value of the statistic parameter in accordance with an embodiment of the present invention.

In addition, the embodiment of the present invention further provides an apparatus for adjusting the value of the statistic parameter. The schematic view of the structure is shown in FIG. 5. The apparatus includes: an adjustment control unit 51, an adjustment checkup unit 52 and an adjustment executing unit 53. The adjustment control unit 51 is adapted to send the adjustment information specified by the MGC. The adjustment information includes statistic parameters and adjustment manner. The adjustment checkup unit 52, connected to the adjustment control unit 51 and the adjustment executing unit 53 respectively, is adapted to judge whether the received adjustment information is suitable for the specified statistic parameter. If the adjustment information is suitable, the judgment result is sent to the adjustment executing unit 53; otherwise, the error information is fed back to the adjustment control unit 51. The adjustment executing unit 53, connected to the adjustment checkup unit 52, is adapted to set the value of the specified statistic parameter according to the judgment result of the adjustment checkup unit, i.e. according to the adjustment manner specified in the adjustment information.

The function and effect of each unit in the apparatus is explained as the implementing process in each step of the above method. Unnecessary details would not be given here.

It can be seen from the above disclosed technical solution that the embodiment of the present invention extends the H.248 protocol. The MGC sends adjustment information to the MG. The MG adjusts the value of the specified statistic parameter in the specified adjustment manner according to the adjustment information. The adjustment manner may be direct value assignment or may be one adjustment operation that the MG executes the adjustment operation combining with the local preset parameter. If the adjustment information may not be recognized or supported by the MG or not suitable for the statistic parameter, the MG returns corresponding error information to the MGC. The adjustment by the MGC to the value of the statistic parameter may be issued with other commands such as Audit, Enable or Disable at the same time to the MG for execution. If the adjustment manner of direct value assignment is adopted, the MG does not need to preserve any data so as to facilitate the MGC for centralized management. If the adjustment manner of issuing adjustment operation is adopted, each MG may define a default parameter of the adjustment operation according to its own practical situation. This is more flexible for the MG. By the returned error information, the MGC can master the clear error reason in time so as to facilitate the follow-up processing for errors. By issuing the adjustment to the value of the statistic parameter and other operations at the same time, the number of messages to be sent can be reduced and the amount of traffic on the communication line between the MGC and the MG can also be reduced. These operations can be effectively supported and the requirements possibly sent simultaneously can be adjusted. For example, after auditing and obtaining the current value of some statistic parameter, it is immediately adjusted to be a standard value for preparing the future statistic.

Though illustration and description of the present disclosure have been given by reference to exemplary embodiments thereof, it should be appreciated by persons of ordinary skills in the art that various changes in forms and details can be made without deviation from the spirit and the scope of this disclosure, which are defined by the appended claims.

What is claimed is:

1. A method for adjusting the value of a statistic parameter, comprising:
issuing, by a media gateway controller (MGC), adjustment information in which a statistic parameter of H.248 to be adjusted and an adjustment manner are specified, to a media gateway (MG), wherein the adjustment manner comprises an operation identifier of adopting specified standard value and the operation identifier is provisioned between the MGC and the MG; and
setting, by the media gateway, the value of the specified statistic parameter in the specified adjustment manner according to the received adjustment information, and taking count on the specified statistic parameter from the set value.

2. The method according to claim 1, wherein, after the media gateway receives the adjustment information, the method comprises:
judging whether the adjustment information can be recognized or supported and whether the adjustment information is suitable for the specified statistic parameter; if the adjustment information can be recognized or supported and the adjustment information is suitable for the specified statistic parameter, adjusting the specified statistic parameter according to the adjustment information; otherwise, returning corresponding error information to the media gateway controller.

3. The method according to claim 2, wherein the error information comprises an error code and/or corresponding explanation.

4. The method according to claim 1, wherein the adjustment information and other operation commands to the statistic parameter are issued to the media gateway at the same time.

5. The method according to claim 4, wherein the other operation commands comprise: Audit, Enable or Disable.

6. The method according to claim 1, wherein the adjustment information is independently issued to the media gateway.

7. An apparatus for adjusting the value of a statistic parameter, comprising:

an adjustment control unit adapted to send adjustment information, specified by a media gateway controller (MGC), comprising a statistic parameter of H.248 and an adjustment manner, to a media gateway (MG), wherein the adjustment manner comprises an operation identifier of adopting specified standard value and the operation identifier is provisioned between the MGC and the MG;

an adjustment executing unit connected to the adjustment control unit and adapted to set the value of the specified statistic parameter according to the adjustment manner specified in received adjustment information, and taking count on the specified statistic parameter from the set value.

8. The apparatus according to claim 7, further comprising an adjustment checkup unit connected to the adjustment control unit and the adjustment executing unit respectively and adapted to judge whether the received adjustment information is suitable for the specified statistic parameter, send the judgment result to the adjustment executing unit if the received adjustment information is suitable for the specified statistic parameter; feed back error information to the adjustment control unit if the received adjustment information is not suitable for the specified statistic parameter.

* * * * *